(12) United States Patent
Ikeda

(10) Patent No.: US 10,411,622 B2
(45) Date of Patent: Sep. 10, 2019

(54) MOTOR CONTROL APPARATUS AND MOTOR CONTROL APPARATUS CONTROL METHOD

(71) Applicant: Mitsuba Corporation, Gunma (JP)

(72) Inventor: Takeshi Ikeda, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 15/776,891

(22) PCT Filed: Dec. 22, 2016

(86) PCT No.: PCT/JP2016/088397
§ 371 (c)(1),
(2) Date: May 17, 2018

(87) PCT Pub. No.: WO2017/115721
PCT Pub. Date: Jul. 6, 2017

(65) Prior Publication Data
US 2018/0337619 A1    Nov. 22, 2018

(30) Foreign Application Priority Data

Dec. 28, 2015    (JP) ................................. 2015-255752

(51) Int. Cl.
*H02P 6/15*    (2016.01)
*H02P 6/16*    (2016.01)

(52) U.S. Cl.
CPC ..................... *H02P 6/15* (2016.02); *H02P 6/16* (2013.01)

(58) Field of Classification Search
CPC .............. H02P 6/15; H02P 6/16; G01P 3/481
See application file for complete search history.

(56) References Cited

U.S. PATENT DOCUMENTS

| 6,081,087 A * | 6/2000 | Iijima ....................... H02P 6/16 |
| | | 318/400.13 |
| 2013/0249452 A1* | 9/2013 | Shinohara ............ G01D 5/2073 |
| | | 318/400.04 |
| 2017/0110994 A1* | 4/2017 | Tanaka ...................... H02P 6/16 |

FOREIGN PATENT DOCUMENTS

| JP | 11215881 A | 8/1999 |
| JP | 2002017097 A | 1/2002 |

(Continued)

OTHER PUBLICATIONS

PCT Office, International Seach Report issued in PCT/JP2016/088397 dated Apr. 4, 2017, 2 pages.

(Continued)

*Primary Examiner* — Eduardo Colon Santana
*Assistant Examiner* — Said Bouziane
(74) *Attorney, Agent, or Firm* — Wood Herron & Evans LLP

(57) ABSTRACT

The control part includes: a gate control voltage output unit that is configured to output a drive signal which switches a switching element according to a Hall edge that forms each of six Hall stages which are represented by a combination of electric potentials of position detection signals that are outputs of a plurality of sensors; a counter value acquisition unit that is configured to acquire a counter value which is a time period of the Hall stage and which is represented by a time period between two Hall edges that form each of the Hall stages from the position detection signal; and a switching control unit that is configured to determine a value obtained by multiplying a previous counter value of each of the Hall stages by a preset correction coefficient as a delay time of each of current Hall edges and that allows the gate (Continued)

control voltage output unit to output a drive signal according to each of the Hall edges which are corrected by the delay time.

5 Claims, 5 Drawing Sheets

(56) References Cited

FOREIGN PATENT DOCUMENTS

| | | |
|---|---|---|
| JP | 2010119220 A | 5/2010 |
| JP | 2011078171 A | 4/2011 |
| JP | 4724024 B | 7/2011 |
| WO | 2018056397 A1 | 3/2018 |

OTHER PUBLICATIONS

Pooya Alaeinovin et al: "Filtering of Hall-Sensor Signals for Improved Operation of Brushless DC Motors", IEEE Transactions on Energy Conversion, IEEE Service Center, Piscataway, NJ, US, vol. 27, No. 2, Jun. 1, 2012, pp. 547-549.

European Patent Office, Search Report issued in EP 16881696.5 dated May 3, 2019, 6 pages.

* cited by examiner

MOTOR CONTROL APPARATUS AND MOTOR CONTROL APPARATUS CONTROL METHOD

TECHNICAL FIELD

The present invention relates to a motor control apparatus and a motor control apparatus control method.

Priority is claimed on Japanese Patent Application No. 2015-255752 filed on Dec. 28, 2015, the contents of which are incorporated herein by reference.

BACKGROUND

A brushless motor includes a stator having three-phase coils U, V, W and a rotor having a field permanent magnet, and a sensor magnet that is rotated together with the rotor is attached to a rotation shaft of the rotor. The sensor magnet is magnetized by S and N poles alternately in a rotation direction. Three Hall sensors that detect a rotation position are attached to the vicinity of the sensor magnet at an interval of 120° in the rotation direction such that it is possible to detect the switching of magnetic poles of the sensor magnet.

In a motor control apparatus that controls and drives the brushless motor, switching positions of three Hall sensors are used as criteria, and by outputting a power distribution pattern that corresponds to each of Hall stages to an inverter circuit that drives the brushless motor, the brushless motor is rotated.

FIG. 4 is a view showing a time chart of position detection signals Hu, Hv, Hw of the three Hall sensors when performing a drive control of the brushless motor. In FIG. 4, a horizontal axis represents an electric angle and a vertical axis represents a voltage level of the position detection signal. As shown in FIG. 4A, the motor control apparatus has a configuration that outputs a drive signal which switches a switching element of the inverter circuit on the basis of a Hall edge that forms each of six Hall stages 1 to 6 which are represented by the combination of electric potentials of the position detection signals Hu, Hv, Hw that are outputs of the three sensors. A time period (a time period of a Hall stage) between two Hall edges that form each of the six Hall stages 1 to 6 corresponds to an electric angle 60° of a time period of a Hall stage.

That is, the time period of a Hall stage 1 corresponds to an electric angle 60° of a time period between a Hall edge which is a rising time point of the position detection signal Hu and a Hall edge which is a falling time point of the position detection signal Hw. The time period of a Hall stage 2 corresponds to an electric angle 60° of a time period between the Hall edge which is a falling time point of the position detection signal Hw and a Hall edge which is a rising time point of the position detection signal Hv. The time period of a Hall stage 3 corresponds to an electric angle 60° of a time period between the Hall edge which is a rising time point of the position detection signal Hv and a Hall edge which is a falling time point of the position detection signal Hu. The time period of a Hall stage 4 corresponds to an electric angle 60° of a time period between the Hall edge which is a falling time point of the position detection signal Hu and a Hall edge which is a rising time point of the position detection signal Hw. The time period of a Hall stage 5 corresponds to an electric angle 60° of a time period between the Hall edge which is a rising time point of the position detection signal Hw and a Hall edge which is a falling time point of the position detection signal Hv. The time period of a Hall stage 6 corresponds to an electric angle 60° of a time period between the Hall edge which is a falling time point of the position detection signal Hv and a Hall edge which is a rising time point of the position detection signal Hu.

In the time period of the Hall stage 1, a Hall pattern 5 that represents the combination of electric potentials of the position detection signals Hu, Hv, Hw is (H (high), L (Low), H). In the time period of the Hall stage 2, a Hall pattern 1 that represents the combination of electric potentials of the position detection signals Hu, Hv, Hw is (H, L, L). In the time period of the Hall stage 3, a Hall pattern 3 that represents the combination of electric potentials of the position detection signals Hu, Hv, Hw is (H, H, L). In the time period of the Hall stage 4, a Hall pattern 2 that represents the combination of electric potentials of the position detection signals Hu, Hv, Hw is (L, H, L). In the time period of the Hall stage 5, a Hall pattern 6 that represents the combination of electric potentials of the position detection signals Hu, Hv, Hw is (L, H, H). In the time period of the Hall stage 6, a Hall pattern 4 that represents the combination of electric potentials of the position detection signals Hu, Hv, Hw is (L, L, H). In this way, the motor control apparatus has a configuration that outputs a drive signal which switches the switching element of the inverter circuit on the basis of the Hall edge that forms each of the six Hall stages 1 to 6 which are represented by the combination of electric potentials of the position detection signals Hu, Hv, Hw that are outputs of the three sensors.

FIG. 4A described above shows an ideal state in which the time period between two Hall edges that form each of the six Hall stages 1 to 6, that is, the time period of the Hall stage is an electric angle 60°. However, there may be cases in which, due to the dispersion of magnetization of the sensor magnet in the brushless motor, the dispersion of the attachment position of the Hall sensor, or the like, as shown in FIG. 4B, the time period between two Hall edges that form each of the six Hall stages 1 to 6, that is, the time period of the Hall stage is not an electric angle 60°.

FIG. 4B shows a case in which the time periods of the Hall stages 1, 4 are less than an electric angle 60°. That is, the time period of the Hall stage 1 between the Hall edge which is a rising time point of the position detection signal Hu and the Hall edge which is a falling time point of the position detection signal Hw is an electric angle t1r which is less than an electric angle 60°. The time period of the Hall stage 4 between the Hall edge which is a falling time point of the position detection signal Hu and the Hall edge which is a rising time point of the position detection signal Hw is an electric angle t4r which is less than an electric angle 60°.

In such a case, during the period of the electric angle t1r, the motor control apparatus outputs a PWM signal (drive signal), for example, that repeats H and L to the inverter circuit in accordance with a power distribution pattern that corresponds to the Hall pattern 5 which represents the combination of electric potentials of the position detection signals Hu, Hv, Hw. During the period of the electric angle t4r, the motor control apparatus outputs a PWM signal that repeats H and L to the inverter circuit in accordance with a power distribution pattern that corresponds to the Hall pattern 2 which represents the combination of electric potentials of the position detection signals Hu, Hv, Hw.

That is, the motor control apparatus uses switching positions of three Hall sensors as criteria and rotates the brushless motor by outputting a drive signal to the inverter circuit that drives the brushless motor. However, actually, due to the dispersion of magnetization of the sensor magnet in the brushless motor, the dispersion of the attachment position of the Hall sensor, or the like, as shown in FIG. 4B, in the motor control apparatus, an actual rotor position and the Hall edge may be displaced from the electric angle 60°. In such a case, when switching the output of the drive signal for each Hall edge, there is a possibility that the switching may affect the motion of the brushless motor, and oscillation or an abnormal sound may occur.

Therefore, a motor drive apparatus is required having a configuration in which the position detection signal is corrected for each Hall edge that indicates switching of a Hall stage, and a power distribution pattern is switched on the basis of the corrected position detection signal.

Motor control apparatuses that prevents oscillation and an abnormal sound from occurring are described in Patent Documents 1, 2. However, the motor drive apparatuses described in Patent Documents 1, 2 does not have a configuration in which the position detection signal is corrected for each Hall edge that indicates switching of a Hall stage, and a power distribution pattern is switched on the basis of the corrected position detection signal. Therefore, it is not possible to prevent oscillation or an abnormal sound from occurring with good accuracy.

RELATED ART DOCUMENTS

Patent Documents

[Patent Document 1] Japanese Unexamined Patent Application, First Publication No. 2010-119220
[Patent Document 2] Japanese Patent No. 4724024

SUMMARY OF INVENTION

Problems to be Solved by the Invention

As described above, a motor drive apparatus is required having a configuration in which the position detection signal is corrected for each Hall edge that indicates switching of a Hall stage, and a power distribution pattern is switched on the basis of the corrected position detection signal.

Therefore, as shown in FIG. 5, a motor control apparatus is required including a function of allowing a time period of a Hall stage of which an interval (a time period of a Hall stage) between Hall edges is narrower than an electric angle 60° to be an electric angle 60°. FIG. 5 is a view showing an example of a time chart of position detection signals Hu, Hv, Hw of the three Hall sensors when performing a drive control of the brushless motor.

As shown in FIG. 5, by correcting a time point of a Hall edge which is a falling time point of the position detection signal Hw to a position of an electric angle 60°, the time period of the Hall stage 1 is allowed to be an electric angle 60°.

By correcting a time point of a Hall edge which is a rising time point of the position detection signal Hv to a position of an electric angle 120°, the time periods of the Hall stages 2, 3 are allowed to be an electric angle 60°. By correcting a time point of a Hall edge which is a rising time point of the position detection signal Hw to a position of an electric angle 240°, the time period of the Hall stage 4 is allowed to be an electric angle 60°. By correcting a time point of a Hall edge which is a falling time point of the position detection signal Hv to a position of an electric angle 300°, the time periods of the Hall stages 5, 6 are allowed to be an electric angle 60°.

An aspect of the present invention has a configuration in which a position detection signal is corrected for each Hall edge that indicates switching of a Hall stage, and a power distribution pattern is switched at each electric angle 60° on the basis of the corrected position detection signal. Thereby, a motor control apparatus and a motor control apparatus control method capable of preventing oscillation or an abnormal sound from occurring with good accuracy are provided.

Means for Solving the Problem

An aspect of the present invention is a motor control apparatus that is configured to perform a power distribution control on three-phase coils of a brushless motor and that is configured to perform a rotation control of a rotor, the motor control apparatus including: a plurality of switching elements that are arranged to be capable of switching a current which flows through the coils; a plurality of sensors each of which is provided so as to correspond to each of the coils and which are configured to detect a rotation position of the rotor; and a control part that is configured to output a drive signal which switches the switching element according to a position detection signal that is an output of the plurality of sensors, wherein the control part includes: a gate control voltage output unit that is configured to output a drive signal which switches the switching element according to a corrected Hall edge that forms each of six Hall stages which are represented by a combination of electric potentials of position detection signals that are outputs of the plurality of sensors; a counter value acquisition unit that is configured to acquire a counter value which is a time period of the Hall stage and which is represented by a time period between two Hall edges that form each of the Hall stages from the position detection signal; and a switching control unit that is configured to determine a value obtained by multiplying a previous counter value of each of the Hall stages by a preset correction coefficient as a delay time of each of current Hall edges and that allows the gate control voltage output unit to output the drive signal according to each of the Hall edges which are corrected by the delay time.

An aspect of the present invention is the motor control apparatus described above, wherein the control part includes: a reference position detection signal determination unit that is configured to determine, among two Hall edges that form a Hall stage of which a counter value that is acquired by the counter value acquisition unit is minimum, a Hall edge of which the counter value is decreased by enlarging the Hall edge in a rotation direction of the brushless motor as a reference Hall edge and that is configured to determine the position detection signal which corresponds to a phase at which the reference Hall edge is present as a reference position detection signal; an average value calculation unit that is configured to calculate an average value of counter values of three phases in the rotation direction of the brushless motor of the reference position detection signal; a detection error calculation unit that is configured to calculate a detection error which is a difference between the average value and the counter value of each of the Hall stages; and a correction coefficient calculation unit that is configured to calculate the correction coefficient of each of the Hall stages by dividing the detection error by the average value.

An aspect of the present invention is the motor control apparatus described above, the control part includes a storage unit that is configured to store the correction coefficient that is obtained by calculating the correction coefficient of the motor control apparatus.

An aspect of the present invention is a motor control apparatus control method in a motor control apparatus that is configured to perform a power distribution control on three-phase coils of a brushless motor and that is configured to perform a rotation control of a rotor, the motor control apparatus including: a plurality of switching elements that are arranged to be capable of switching a current which flows through the coils; a plurality of sensors each of which is provided so as to correspond to each of the coils and which are configured to detect a rotation position of the rotor; and a control part that is configured to output a drive signal which switches the switching element according to a position detection signal that is an output of the plurality of sensors, the control part including a gate control voltage output unit, a counter value acquisition unit, and a switching control unit, the motor control apparatus control method including: a gate control voltage output step in which the gate control voltage output unit outputs a drive signal that switches the switching element according to a corrected Hall edge that forms each of six Hall stages which are represented by a combination of electric potentials of position detection signals that are outputs of the plurality of sensors; a counter value acquisition step in which the counter value acquisition unit acquires a counter value which is a time period of the Hall stage and which is represented by a time period between two Hall edges that form each of the Hall stages from the position detection signal; and a switching control step in which the switching control unit determines a value obtained by multiplying a previous counter value of each of the Hall stages by a preset correction coefficient as a delay time of each of current Hall edges and allows the gate control voltage output unit to output the drive signal according to each of the Hall edges which are corrected by the delay time.

Advantage of the Invention

As described above, the present invention has a configuration in which a position detection signal is corrected for each Hall edge that indicates switching of a Hall stage, and a power distribution pattern is switched at each electric angle 60° on the basis of the corrected position detection signal. Thereby, it is possible to provide a motor control apparatus and a motor control apparatus control method capable of preventing oscillation or an abnormal sound from occurring with good accuracy.

DESCRIPTION OF THE EMBODIMENTS

Figure 1:
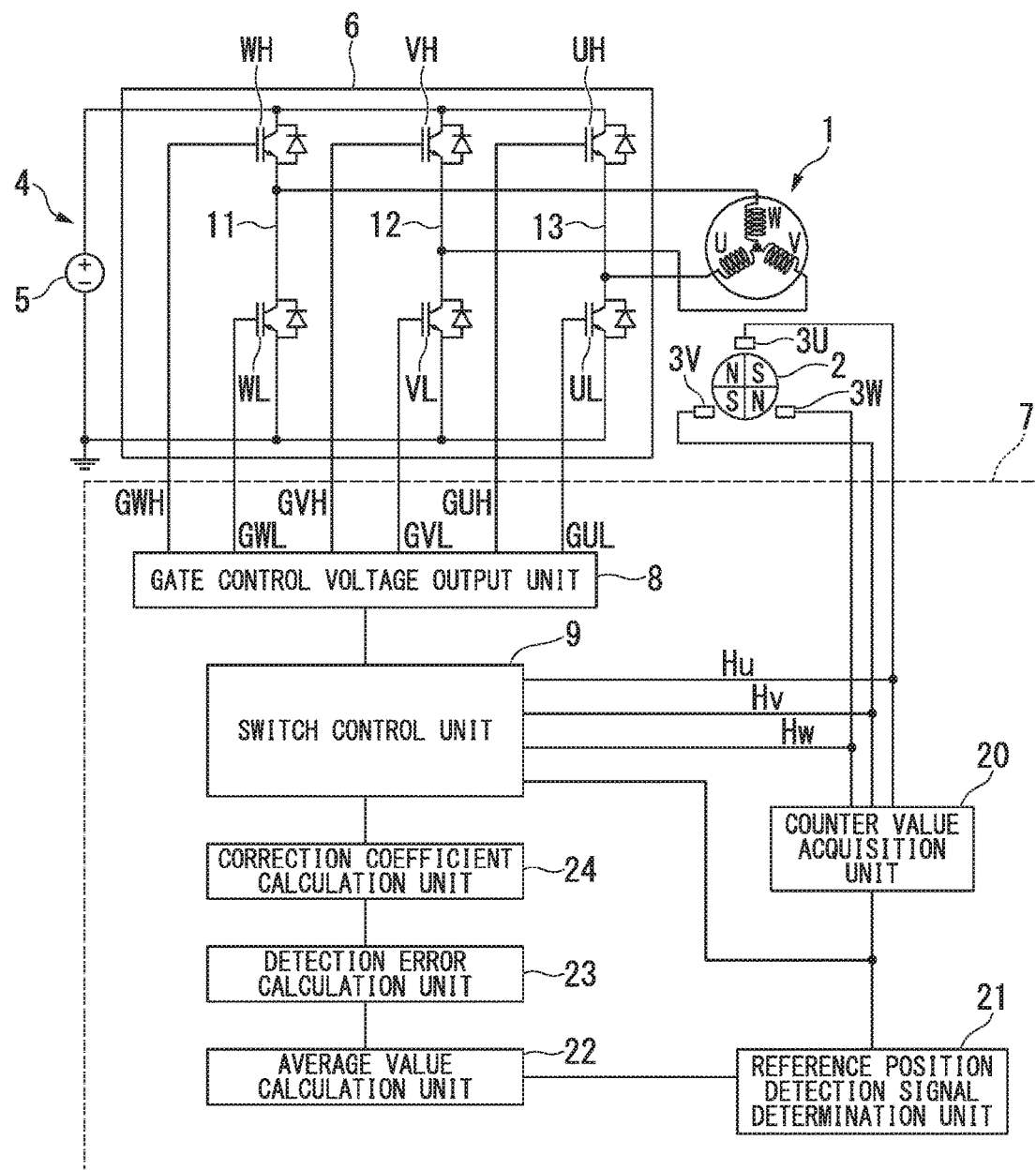
FIG. 1 is a block diagram showing a control system of a motor control apparatus of the present invention.

Hereinafter, aspects of the present invention are described according to an embodiment of the invention, but the following embodiment does not limit the invention according to claims. Further, all of the combinations of features described in the embodiment are not necessarily indispensable for solving the problem addressed by the invention. In the drawings, the same reference numerals may be given to the same or similar parts, and redundant descriptions may be omitted. The shape, size, and the like of an element in the drawing may be exaggerated for clear description.

A motor control apparatus in an embodiment is a motor control apparatus that is configured to perform a power distribution control on three-phase coils of a brushless motor and that is configured to perform a rotation control of a rotor, the motor control apparatus including: a plurality of switching elements that are arranged to be capable of switching a current which flows through the coils; a plurality of sensors each of which is provided so as to correspond to each of the coils and which are configured to detect a rotation position of the rotor; and a control part that is configured to output a drive signal which switches the switching element according to a position detection signal that is an output of the plurality of sensors. The control part includes: a gate control voltage output unit that is configured to output a drive signal that switches the switching element according to a corrected Hall edge that forms each of six Hall stages which are represented by a combination of electric potentials of position detection signals that are outputs of the plurality of sensors; a counter value acquisition unit that is configured to acquire a counter value which is a time period of the Hall stage and which is represented by a time period between two Hall edges that form each of the Hall stages from the position detection signal; and a switching control unit that is configured to determine a value obtained by multiplying a previous counter value of each of the Hall stages by a preset correction coefficient as a delay time of each of current Hall edges and that allows the gate control voltage output unit to output the drive signal according to each of the Hall edges which are corrected by the delay time.

Hereinafter, the motor control apparatus in the embodiment is described with reference to the drawings.

FIG. 1 is a block diagram showing a control system of the motor control apparatus of the present invention. FIG. 1 shows a configuration of a brushless motor 1 and a motor control apparatus 4.

A brushless motor 1 includes a stator having three-phase coils U, V, W and a rotor having a field permanent magnet, and a sensor magnet 2 that is rotated together with the rotor is attached to a rotation shaft of the rotor.

The sensor magnet 2 is magnetized by S and N poles alternately in a rotation direction. Three Hall sensors 3U, 3V, 3W that detect a rotation position are attached to the vicinity of the sensor magnet 2 at an interval of 120° in the rotation direction such that it is possible to detect the switching of magnetic poles of the sensor magnet 2.

A motor control apparatus 4 includes an inverter circuit 6 that switches a current which flows from a DC electric power source 5 to the coils U, V, W, the three Hall sensors 3U, 3V, 3W, and a control part 7 to which an output of each of the three Hall sensors 3U, 3V, 3W is input and which performs switching of the inverter circuit 6.

In the inverter circuit 6, three arms 11, 12, 13 are connected to the DC electric power source 5 in parallel. In the first arm 11, a connection point between two switching elements WH, WL is connected to the coil W. In the second arm 12, a connection point between two switching elements VH, VL is connected to the coil V. In the third arm 13, a connection point between two switching elements UH, UL is connected to the coil U.

The coils U, V, W are connected, for example, by a star connection, and each of end parts of the coils U, V, W on the opposite side of the connecting point is electrically connected to the inverter circuit 6.

The Hall sensors 3U, 3V, 3W included in the motor control apparatus 4 are formed of, for example, a Hall IC. When the rotation shaft of the rotor is rotated, the Hall sensors 3U, 3V, 3W detects the rotation position of the rotation shaft. Then, the Hall sensors 3U, 3V, 3W outputs position detection signals Hu, Hv, Hw individually as output signals corresponding to U, V, W-phases to the control part 7.

The control part 7 is a microcomputer that includes a CPU, a RAM, a ROM, and the like. The control part 7 includes a gate control voltage output unit 8, a switch control unit 9, a counter value acquisition unit 20, a reference position detection signal determination unit 21, an average value calculation unit 22, a detection error calculation unit 23, and a correction coefficient calculation unit 24.

The gate control voltage output unit 8 outputs a PWM signal (drive signal) which switches switching elements WH, WL, VH, VL, UH, UL on the basis of a corrected Hall edge that forms each of six Hall stages which are represented by the combination of electric potentials of the position detection signals Hu, Hv, Hw that are outputs of the Hall sensors 3U, 3V, 3W.

The counter value acquisition unit 20 acquires a counter value which is a time period of the Hall stage and which is represented by a time period between two Hall edges that form each of the Hall stages 1 to 6 from the position detection signals Hu, Hv, Hw that are input from the Hall sensors 3U, 3V, 3W.

The switch control unit 9 recognizes a Hall stage on the basis of the position detection signals Hu, Hv, Hw that are input from the Hall sensors 3U, 3V, 3W and reads out a power distribution pattern that corresponds to the Hall stage and that is stored in the ROM which is included in the control part 7. The switch control unit 9 determines a value obtained by multiplying a previous (earlier by an electric angle 360°) counter value of each of the Hall stages by a preset correction coefficient as a delay time of each of current Hall edges, generates a PWM command signal having a time period of an electric angle 60° on the basis of each of the Hall edges that are corrected by the delay time from the power distribution pattern, and allows the gate control voltage output unit 8 to output the PWM signal having a time period of an electric angle 60°.

Thereby, each of the switching elements WH, WL, VH, VL, UH, UL is driven by a PWM control and is intermittently turned on and off in a time period that corresponds to each power distribution pattern.

The preset correction coefficient is, for example, calculated by the reference position detection signal determination unit 21, the average value calculation unit 22, the detection error calculation unit 23, and the correction coefficient calculation unit 24 before shipping of the motor control apparatus 4 and is stored in the ROM (storage unit) that is formed so as to store the correction coefficient and that is included in the control part 7. It is possible to perform storing of the correction coefficient before shipping, at the time of shipping, or after shipping of the motor control apparatus 4.

The reference position detection signal determination unit 21 determines, among two Hall edges that form a Hall stage of which a counter value that is acquired by the counter value acquisition unit 20 is minimum, a Hall edge of which the counter value is decreased by enlarging the Hall edge in a rotation direction of the brushless motor 1 as a reference Hall edge and determines any one of the position detection signals Hu, Hv, Hw which corresponds to a phase at which the reference Hall edge is present as a reference position detection signal.

The average value calculation unit 22 calculates an average value of counter values of three phases in the rotation direction of the brushless motor 1 of the reference position detection signal that is determined by the reference position detection signal determination unit 21.

The detection error calculation unit 23 calculates a detection error which is a difference between the average value that is calculated by the average value calculation unit 22 and the counter value of each Hall stage.

The correction coefficient calculation unit 24 calculates the correction coefficient of each Hall stage by dividing the detection error that is calculated by the detection error calculation unit 23 by the average value that is calculated by the average value calculation unit 22.

Thereby, it is possible for the switch control unit 9 to determine a value obtained by multiplying a previous counter value of each of the Hall stages by a preset correction coefficient as a delay time of each of current Hall edges, generate a PWM command signal having a time period of an electric angle 60° on the basis of each of the Hall edges that are corrected by the delay time, and allow the gate control voltage output unit 8 to output the PWM signal having a time period of an electric angle 60°.

Hereinafter, a calculation method of a correction coefficient is described with reference to the drawings.

Figure 2:
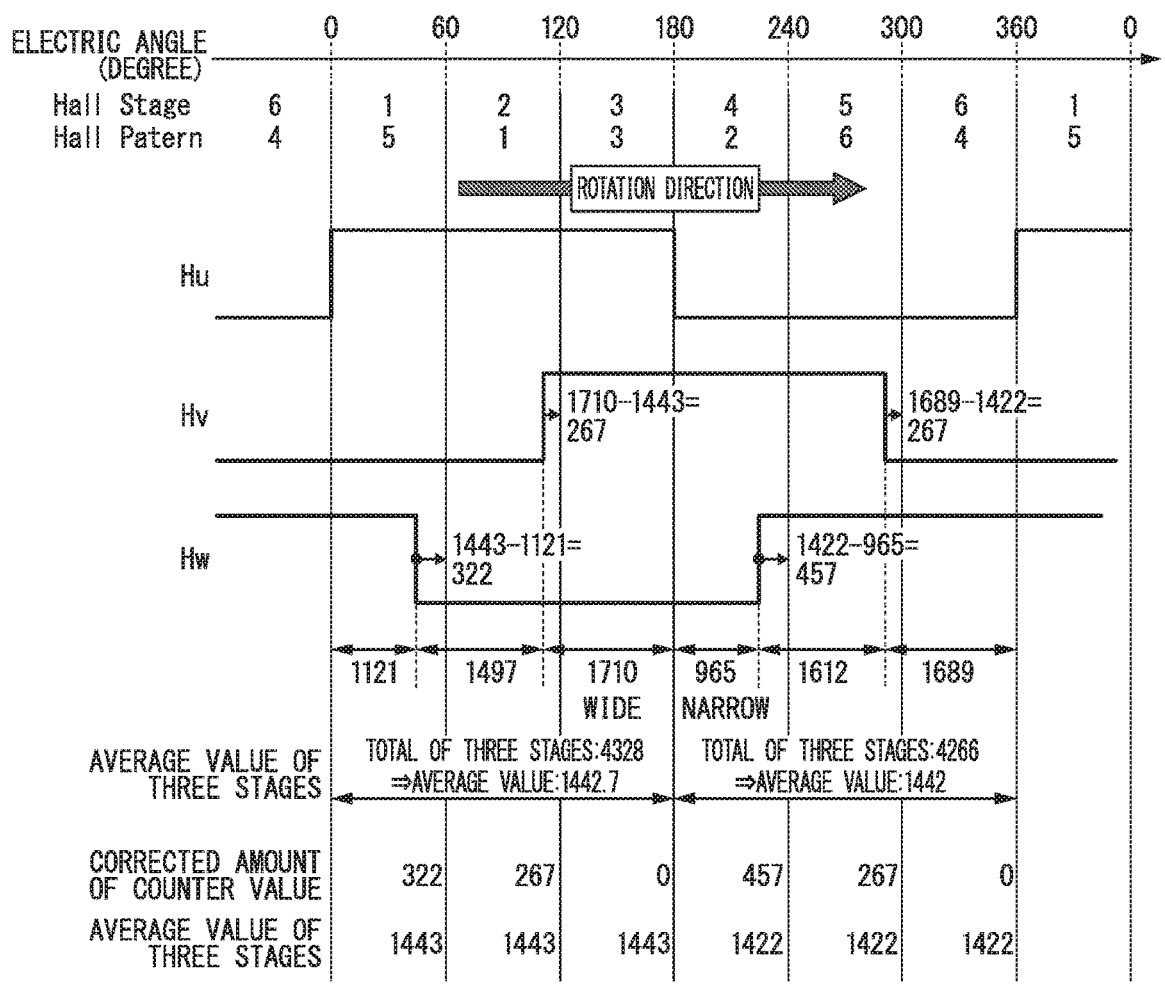
FIG. 2 is a view showing a calculation method of a correction coefficient when performing a normal rotation drive control of a brushless motor.

FIG. 2 is a view showing an example of calculating a correction coefficient when performing a normal rotation drive control of a brushless motor.

The rotation number of the motor when calculating the correction coefficient may be an arbitrary rotation number.

The counter value acquisition unit 20 acquires a counter value from the position detection signals Hu, Hv, Hw that are input from the Hall sensors 3U, 3V, 3W. The counter value is a time period of a Hall stage, which is represented by a time period between two Hall edges that form each of the Hall stages 1 to 6.

In a case shown in FIG. 2, the counter value acquisition unit 20 acquires 1121 counts regarding the Hall stage 1, 1497 counts regarding the Hall stage 2, 1710 counts regarding the Hall stage 3, 965 counts regarding the Hall stage 4, 1612 counts regarding the Hall stage 5, and 1689 counts regarding the Hall stage 6.

Next, the reference position detection signal determination unit 21 determines, among two Hall edges that form a Hall stage of which the counter value that is acquired by the counter value acquisition unit 20 is minimum, a Hall edge of which the counter value is decreased by enlarging the Hall edge in the rotation direction of the brushless motor 1 as a reference Hall edge and determines any one of the position detection signals Hu, Hv, Hw which corresponds to a phase at which the reference Hall edge is present as a reference position detection signal.

In the case shown in FIG. 2, the reference position detection signal determination unit 21 cannot increase the count of the Hall stage 4 by enlarging the falling position of the position detection signal Hu that forms the Hall stage 4 of which the counter value is minimum among the six counter values with respect to the rotation direction, therefore determines the falling position of the position detection signal Hu as the reference Hall edge, and determines the position detection signal Hu which corresponds to a phase at which the reference Hall edge is present as the reference position detection signal.

Next, the average value calculation unit 22 calculates an average value of counter values of three phases in the rotation direction of the brushless motor 1 of the reference position detection signal that is determined by the reference position detection signal determination unit 21.

In the case shown in FIG. 2, the average value calculation unit 22 calculates an average value 1442.7 from a total value 4328 of three stages (Hall stages 1 to 3) in which the position detection signal Hu is in a H level among the counter values of three phases in the rotation direction of the position detection signal Hu and calculates an average value 1422 from a total value 4266 of three stages (Hall stages 4 to 6) in which the position detection signal Hu is in a L level.

Next, the detection error calculation unit 23 calculates a detection error which is a difference between the average value that is calculated by the average value calculation unit 22 and the counter value of each Hall stage.

In the case shown in FIG. 2, the detection error calculation unit 23 calculates a detection error 322 of the Hall stage 1 by subtracting the counter value 1121 of the Hall stage 1 from the average value 1443 (a value obtained by rounding up the decimal part of 1442.7) that is calculated by the average value calculation unit 22.

Further, the detection error calculation unit 23 calculates a detection error 267 of the Hall stage 2 by subtracting the average value 1443 that is calculated by the average value calculation unit 22 from the counter value 1710 of the Hall stage 3.

Further, the detection error calculation unit 23 calculates a detection error 457 of the Hall stage 4 by subtracting the counter value 965 of the Hall stage 4 from the average value 1422 that is calculated by the average value calculation unit 22.

Further, the detection error calculation unit 23 calculates a detection error 267 of the Hall stage 5 by subtracting the average value 1422 that is calculated by the average value calculation unit 22 from the counter value 1689 of the Hall stage 6.

In this way, the detection error calculation unit 23 calculates the detection error of each of the Hall stages such that the counter values of the Hall stages 1 to 6 become the same value.

Next, the correction coefficient calculation unit 24 calculates the correction coefficient of each of the Hall stages by dividing the detection error that is calculated by the detection error calculation unit 23 by the average value that is calculated by the average value calculation unit 22.

In the case shown in FIG. 2, the correction coefficient calculation unit 24 calculates the correction coefficient (in this case, 322/1443) of the Hall stage 1 by dividing the detection error 322 that is calculated by the detection error calculation unit 23 by the average value 1443 that is calculated by the average value calculation unit 22.

Further, the correction coefficient calculation unit 24 calculates the correction coefficient (in this case, 267/1443) of the Hall stage 2 by dividing the detection error 267 that is calculated by the detection error calculation unit 23 by the average value 1443 that is calculated by the average value calculation unit 22.

Further, the correction coefficient calculation unit 24 calculates the correction coefficient (in this case, 0/1443) of the Hall stage 3 by dividing the detection error 0 that is calculated by the detection error calculation unit 23 by the average value 1443 that is calculated by the average value calculation unit 22.

Further, the correction coefficient calculation unit 24 calculates the correction coefficient (in this case, 457/1422) of the Hall stage 4 by dividing the detection error 457 that is calculated by the detection error calculation unit 23 by the average value 1422 that is calculated by the average value calculation unit 22.

Further, the correction coefficient calculation unit 24 calculates the correction coefficient (in this case, 267/1422) of the Hall stage 5 by dividing the detection error 267 that is calculated by the detection error calculation unit 23 by the average value 1422 that is calculated by the average value calculation unit 22.

Further, the correction coefficient calculation unit 24 calculates the correction coefficient (in this case, 0/1422) of the Hall stage 6 by dividing the detection error 0 that is calculated by the detection error calculation unit 23 by the average value 1422 that is calculated by the average value calculation unit 22.

In this way, the correction coefficient calculation unit 24 calculates the correction coefficient by which the counter values of the Hall stages 1 to 6 become the same value and stores the correction coefficient when performing a normal rotation drive control of the brushless motor 1 in the ROM included in the control part 7.

Thereby, the switching control unit 9 determines a value obtained by multiplying the previous counter value of each of the Hall stages by the preset correction coefficient as a delay time of each of current Hall edges. Then, the switch control unit 9 generates a PWM command signal having a time period of an electric angle 60° on the basis of each of the Hall edges that are corrected by the delay time. Then, the switch control unit 9 allows the gate control voltage output unit 8 to output the PWM signal having a time period of an electric angle 60° and thereby can perform a normal rotation drive control of the brushless motor 1.

For example, in a case of an example shown in FIG. 2, the switching control unit 9 determines a counter value 223 obtained by multiplying the previous counter value (assumed as a counter value 1000) of the Hall stage 1 by the preset correction coefficient (322/1443 described above) as a delay time of the falling time point (current Hall edge) of the position detection signal Hw that constitutes the Hall stage 1 and generates a PWM command signal on the basis of the Hall edge which is corrected by the delay time.

Further, in the case of an example shown in FIG. 2, the switching control unit 9 determines a counter value obtained by multiplying the previous counter value of the Hall stage 2 by 267/1443 described above as a delay time of the rising time point of the position detection signal Hv that constitutes the Hall stage 2 and generates a PWM command signal on the basis of the Hall edge which is corrected by the delay time.

Further, in the case of an example shown in FIG. 2, the switching control unit 9 determines a counter value obtained by multiplying the previous counter value of the Hall stage 3 by 0/1443 described above as a delay time 0 of the falling time point of the position detection signal Hu that constitutes the Hall stage 3 and generates a PWM command signal on the basis of the Hall edge which is corrected by the delay time 0, that is, which is not corrected.

Further, in the case of an example shown in FIG. 2, the switching control unit 9 determines a counter value obtained by multiplying the previous counter value of the Hall stage 4 by 457/1422 described above as a delay time of the rising time point of the position detection signal Hw that constitutes the Hall stage 4 and generates a PWM command signal on the basis of the Hall edge which is corrected by the delay time.

Further, in the case of an example shown in FIG. 2, the switching control unit 9 determines a counter value obtained by multiplying the previous counter value of the Hall stage 5 by 267/1422 described above as a delay time of the falling time point of the position detection signal Hv that constitutes the Hall stage 5 and generates a PWM command signal on the basis of the Hall edge which is corrected by the delay time.

Further, in the case of an example shown in FIG. 2, the switching control unit 9 determines a counter value obtained by multiplying the previous counter value of the Hall stage 6 by 0/1422 described above as a delay time 0 of the rising time point of the position detection signal Hu that constitutes the Hall stage 6 and generates a PWM command signal on the basis of the Hall edge which is corrected by the delay time 0, that is, which is not corrected.

Figure 3:
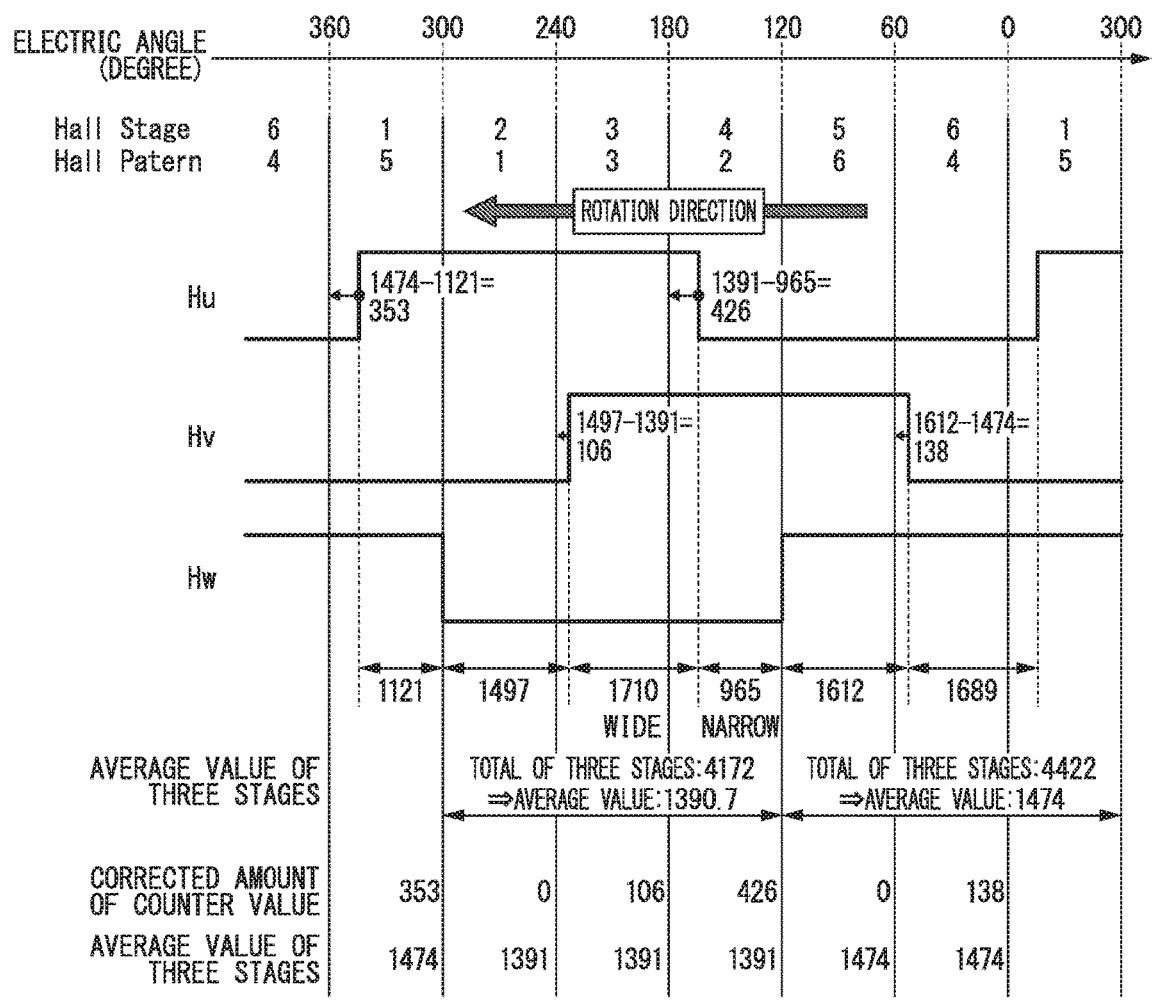
FIG. 3 is a view showing a calculation method of a correction coefficient when performing a reverse rotation drive control of the brushless motor.
Figure 4A:
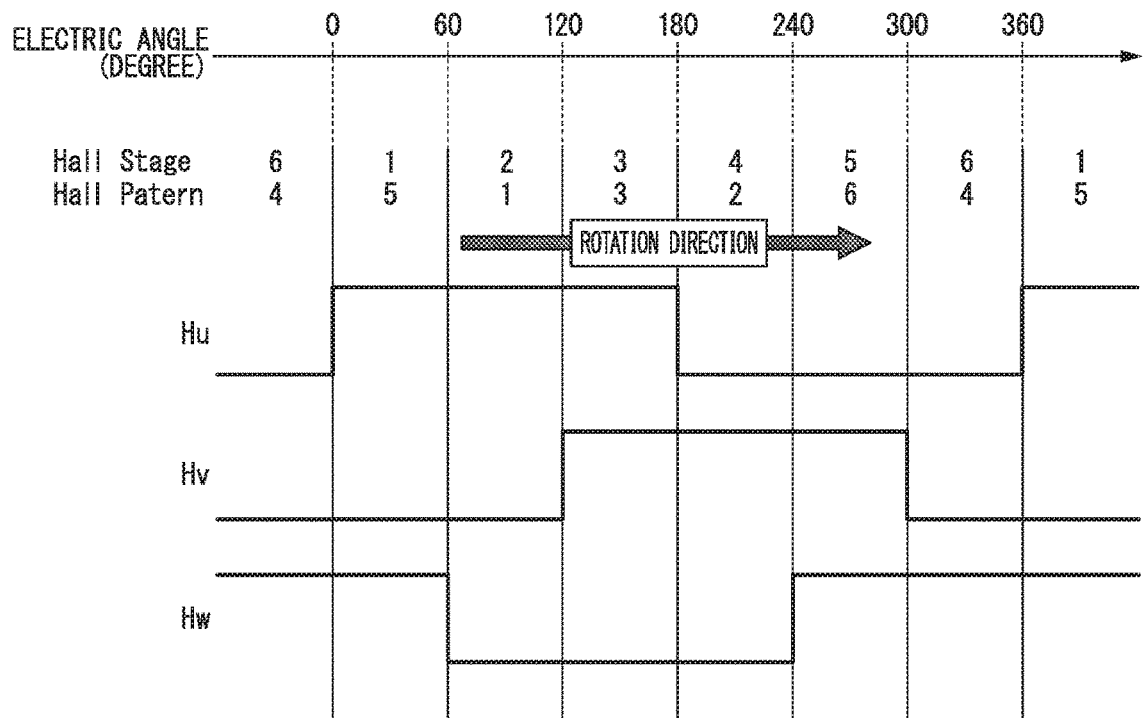
FIG. 4A is a view showing a time chart of position detection signals Hu, Hv, Hw of three Hall sensors when performing a drive control of the brushless motor.
Figure 4B:
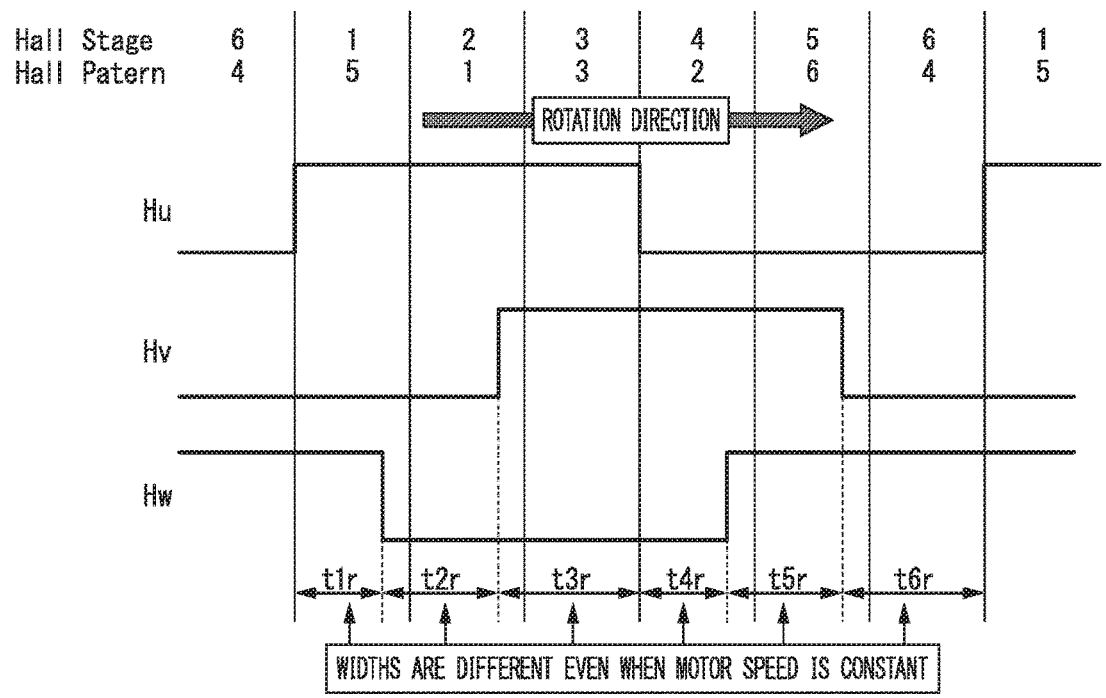
FIG. 4B is a view showing a time chart of the position detection signals Hu, Hv, Hw of the three Hall sensors when performing a drive control of the brushless motor.
Figure 5:
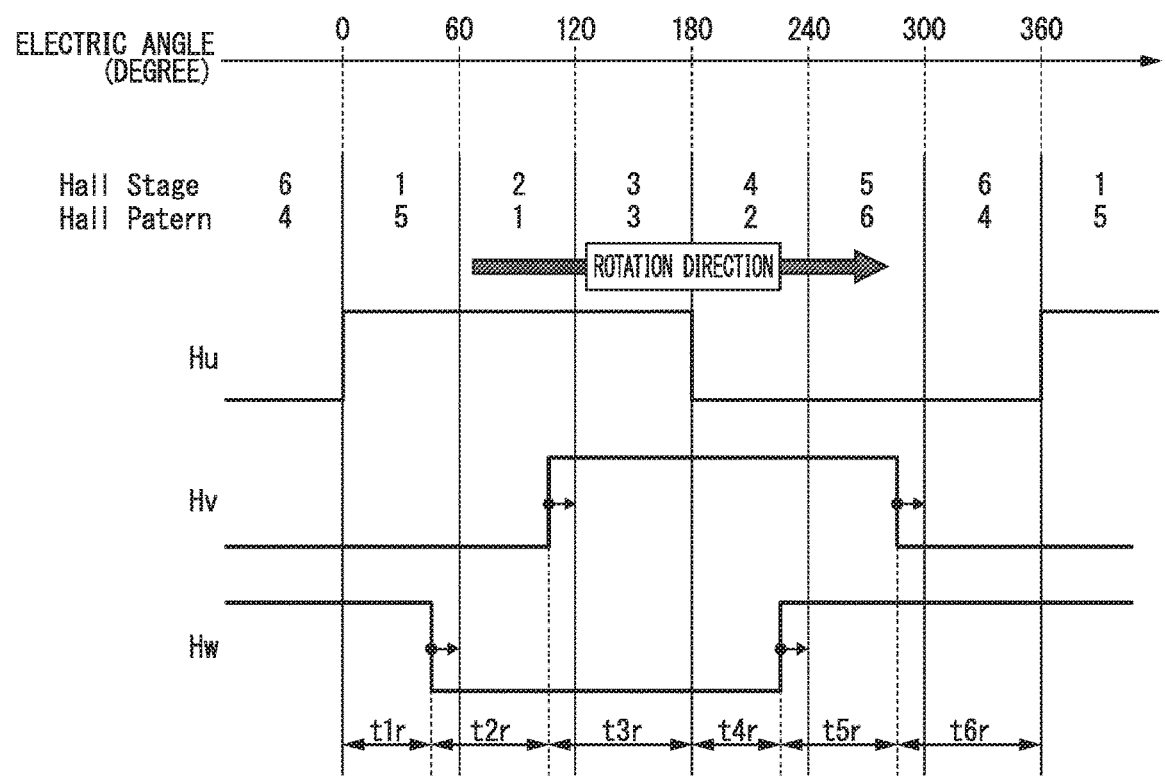
FIG. 5 is a view showing an example of a time chart of the position detection signals Hu, Hv, Hw of the three Hall sensors when performing a drive control of the brushless motor.

FIG. 3 is a view showing an example of calculating a correction coefficient when performing a reverse rotation drive control of a brushless motor.

The rotation number of the motor when calculating the correction coefficient may be an arbitrary rotation number.

The counter value acquisition unit 20 acquires a counter value that is a time period of a Hall stage, which is represented by a time period between two Hall edges that form each of the Hall stages 1 to 6 from the position detection signals Hu, Hv, Hw that are input from the Hall sensors 3U, 3V, 3W.

In a case shown in FIG. 3, the counter value acquisition unit 20 acquires 1689 counts regarding the Hall stage 6, 1612 counts regarding the Hall stage 5, 965 counts regarding the Hall stage 4, 1710 counts regarding the Hall stage 3, 1497 counts regarding the Hall stage 2, and 1121 counts regarding the Hall stage 1.

Next, the reference position detection signal determination unit 21 determines, among two Hall edges that form a Hall stage of which the counter value that is acquired by the counter value acquisition unit 20 is minimum, a Hall edge of which the counter value is decreased by enlarging the Hall edge in the rotation direction of the brushless motor 1 as a reference Hall edge and determines any one of the position detection signals Hu, Hv, Hw which corresponds to a phase at which the reference Hall edge is present as a reference position detection signal.

In the case shown in FIG. 3, the reference position detection signal determination unit 21 cannot increase the count of the Hall stage 4 by enlarging the falling position of the position detection signal Hw that forms the Hall stage 4 of which the counter value is minimum among the six counter values with respect to the rotation direction, therefore determines the falling position of the position detection signal Hw as the reference Hall edge, and determines the position detection signal Hw which corresponds to a phase at which the reference Hall edge is present as the reference position detection signal.

Next, the average value calculation unit 22 calculates an average value of counter values of three phases in the rotation direction of the brushless motor 1 of the reference position detection signal that is determined by the reference position detection signal determination unit 21.

In the case shown in FIG. 3, the average value calculation unit 22 calculates an average value 1474 from a total value 4422 of three stages (Hall stages 1, 6, 5) in which the position detection signal Hw is in a H level among the counter values of three phases in the rotation direction of the position detection signal Hw and calculates an average value 1390.7 from a total value 4172 of three stages (Hall stages 2 to 4) in which the position detection signal Hw is in a L level.

Next, the detection error calculation unit 23 calculates a detection error which is a difference between the average value that is calculated by the average value calculation unit 22 and the counter value of each Hall stage.

In the case shown in FIG. 3, the detection error calculation unit 23 calculates a detection error 353 of the Hall stage 1 by subtracting the counter value 1121 of the Hall stage 1 from the average value 1474 that is calculated by the average value calculation unit 22.

Further, the detection error calculation unit 23 calculates a detection error 106 of the Hall stage 3 by subtracting the average value 1391 (a value obtained by rounding up the decimal part of 1390.7) that is calculated by the average value calculation unit 22 from the counter value 1497 of the Hall stage 2.

Further, the detection error calculation unit 23 calculates a detection error 426 of the Hall stage 4 by subtracting the counter value 965 of the Hall stage 4 from the average value 1391 that is calculated by the average value calculation unit 22.

Further, the detection error calculation unit 23 calculates a detection error 138 of the Hall stage 6 by subtracting the average value 1474 that is calculated by the average value calculation unit 22 from the counter value 1612 of the Hall stage 5.

In this way, the detection error calculation unit 23 calculates the detection error of each of the Hall stages such that the counter values of the Hall stages 1 to 6 become the same value.

Next, the correction coefficient calculation unit 24 calculates the correction coefficient of each of the Hall stages by dividing the detection error that is calculated by the detection error calculation unit 23 by the average value that is calculated by the average value calculation unit 22.

In the case shown in FIG. 3, the correction coefficient calculation unit 24 calculates the correction coefficient (in this case, 353/1474) of the Hall stage 1 by dividing the detection error 353 that is calculated by the detection error calculation unit 23 by the average value 1474 that is calculated by the average value calculation unit 22.

Further, the correction coefficient calculation unit 24 calculates the correction coefficient (in this case, 0/1391) of the Hall stage 2 by dividing the detection error 0 that is calculated by the detection error calculation unit 23 by the average value 1391 that is calculated by the average value calculation unit 22. Further, the correction coefficient calculation unit 24 calculates the correction coefficient (in this case, 106/1391) of the Hall stage 3 by dividing the detection error 106 that is calculated by the detection error calculation unit 23 by the average value 1391 that is calculated by the average value calculation unit 22.

Further, the correction coefficient calculation unit 24 calculates the correction coefficient (in this case, 426/1391) of the Hall stage 4 by dividing the detection error 426 that is calculated by the detection error calculation unit 23 by the average value 1391 that is calculated by the average value calculation unit 22.

Further, the correction coefficient calculation unit 24 calculates the correction coefficient (in this case, 0/1474) of the Hall stage 5 by dividing the detection error 0 that is calculated by the detection error calculation unit 23 by the average value 1474 that is calculated by the average value calculation unit 22.

Further, the correction coefficient calculation unit 24 calculates the correction coefficient (in this case, 138/1474) of the Hall stage 6 by dividing the detection error 138 that is calculated by the detection error calculation unit 23 by the average value 1474 that is calculated by the average value calculation unit 22.

In this way, the correction coefficient calculation unit 24 calculates the correction coefficient by which the counter values of the Hall stages 1 to 6 become the same value and stores the correction coefficient when performing a reverse rotation drive control of the brushless motor 1 in the ROM included in the control part 7.

Thereby, the switching control unit 9 determines a value obtained by multiplying the previous counter value of each Hall stage by the preset correction coefficient as a delay time of each of current Hall edges. Then, the switch control unit 9 generates a PWM command signal having a time period of an electric angle 60° on the basis of each of the Hall edges that are corrected by the delay time. Then, the switch control unit 9 allows the gate control voltage output unit 8 to output the PWM signal having a time period of an electric angle 60° and thereby can perform a reverse rotation drive control of the brushless motor 1.

For example, in a case of an example shown in FIG. 3, the switching control unit 9 determines a counter value 223 obtained by multiplying the previous counter value of the Hall stage 1 by the preset correction coefficient (353/1474 described above) as a delay time of the falling time point (current Hall edge) of the position detection signal Hu that constitutes the Hall stage 1 and generates a PWM command signal on the basis of the Hall edge which is corrected by the delay time.

Further, in the case of an example shown in FIG. 3, the switching control unit 9 determines a counter value obtained by multiplying the previous counter value of the Hall stage 2 by 0/1391 described above as a delay time 0 of the rising time point of the position detection signal Hv that constitutes the Hall stage 2 and generates a PWM command signal on the basis of the Hall edge which is corrected by the delay time 0, that is, which is not corrected.

Further, in the case of an example shown in FIG. 3, the switching control unit 9 determines a counter value obtained by multiplying the previous counter value of the Hall stage 3 by 106/1391 described above as a delay time of the falling time point of the position detection signal Hv that constitutes the Hall stage 3 and generates a PWM command signal on the basis of the Hall edge which is corrected by the delay time.

Further, in the case of an example shown in FIG. 3, the switching control unit 9 determines a counter value obtained by multiplying the previous counter value of the Hall stage 4 by 426/1391 described above as a delay time of the rising time point of the position detection signal Hu that constitutes the Hall stage 4 and generates a PWM command signal on the basis of the Hall edge which is corrected by the delay time.

Further, in the case of an example shown in FIG. 3, the switching control unit 9 determines a counter value obtained by multiplying the previous counter value of the Hall stage 5 by 0/1474 described above as a delay time 0 of the falling time point of the position detection signal Hw that constitutes the Hall stage 5 and generates a PWM command signal on the basis of the Hall edge which is corrected by the delay time 0, that is, which is not corrected.

Further, in the case of an example shown in FIG. 3, the switching control unit 9 determines a counter value obtained by multiplying the previous counter value of the Hall stage 6 by 138/1474 described above as a delay time of the rising time point of the position detection signal Hu that constitutes the Hall stage 6 and generates a PWM command signal on the basis of the Hall edge which is corrected by the delay time.

In this way, the aspect of the present invention has the control part 9 that corrects a position detection signal for each Hall edge that indicates switching of a Hall stage and switches a power distribution pattern at each electric angle 60° on the basis of the corrected position detection signal. Thereby, it is possible to provide the motor control apparatus 4 and a control method of the motor control apparatus 4 capable of preventing oscillation or an abnormal sound from occurring with good accuracy.

The motor control apparatus 4 in the embodiment described above may be realized by a computer. In this case, a program for realizing this function may be recorded in a computer-readable recording medium, and the program recorded in the recording medium may be read into and executed on a computer system to thereby realize the function. The "computer system" used herein includes an OS or hardware such as peripherals. The "computer-readable recording medium" refers to portable media such as a flexible disk, a magneto-optical disc, a ROM, and a CD-ROM and a storage device such as a hard disk embedded in the computer system. Further, the "computer-readable recording medium" may include a recording medium that holds a program dynamically for a short period of time like a network such as the Internet or a communication line when a program is transmitted through a communication line such as a telephone line and may include a recording medium that stores a program for a predetermined period of time like a volatile memory in a computer system which serves as a server or a client in that case. Further, the above program may be a program for realizing some of the functions described above, may be a program capable of realizing the above functions by combination with a program already recorded in the computer system, or may be a program that is realized by using a programmable logic device such as the FPGA (Field Programmable Gate Array).

Although the embodiment of the aspect of the invention has been described in detail with reference to the drawings, a specific configuration is not limited to the embodiment, and designs and the like without departing from the scope of the invention are also included.

DESCRIPTION OF THE REFERENCE SYMBOLS 1 brushless motor
3U, 3V, 3W Hall sensor
4 motor control apparatus
6 inverter circuit
7 control part
8 gate control voltage output unit
9 switch control unit
20 counter value acquisition unit
21 reference position detection signal determination unit
22 average value calculation unit
23 detection error calculation unit
24 correction coefficient calculation unit
U, V, W coil
UH, UL, VH, VL, WH, WL switching element

What is claimed is:

1. A motor control apparatus that is configured to perform a power distribution control on three-phase coils of a brushless motor and that is configured to perform a rotation control of a rotor, the motor control apparatus comprising:
   a plurality of switching elements that are arranged to be capable of switching a current which flows through the coils;
   a plurality of sensors each of which is provided so as to correspond to each of the coils and which are configured to detect a rotation position of the rotor; and
   a control part that is configured to output a drive signal which switches the switching element according to a position detection signal that is an output of the plurality of sensors,
   wherein the control part comprises:
   a gate control voltage output unit that is configured to output a drive signal which switches the switching element according to a corrected Hall edge that forms each of six Hall stages which are represented by a combination of electric potentials of position detection signals that are outputs of the plurality of sensors;
   a counter value acquisition unit that is configured to acquire a counter value which is a time period of the Hall stage and which is represented by a time period between two Hall edges that form each of the Hall stages from the position detection signal; and
   a switching control unit that is configured to determine a value obtained by multiplying a previous counter value of each of the Hall stages by a preset correction coefficient as a delay time of each of current Hall edges and that allows the gate control voltage output unit to output the drive signal according to each of the Hall edges which are corrected by the delay time.

2. The motor control apparatus according to claim 1, wherein the control part comprises:
   a reference position detection signal determination unit that is configured to determine, among two Hall edges that form a Hall stage of which a counter value that is acquired by the counter value acquisition unit is minimum, a Hall edge of which the counter value is decreased by enlarging the Hall edge in a rotation direction of the brushless motor as a reference Hall edge and that is configured to determine the position detection signal which corresponds to a phase at which the reference Hall edge is present as a reference position detection signal;
   an average value calculation unit that is configured to calculate an average value of counter values of three phases in the rotation direction of the brushless motor of the reference position detection signal;
   a detection error calculation unit that is configured to calculate a detection error which is a difference between the average value and the counter value of each of the Hall stages; and
   a correction coefficient calculation unit that is configured to calculate the correction coefficient of each of the Hall stages by dividing the detection error by the average value.

3. The motor control apparatus according to claim 1, wherein the control part comprises a storage unit that is configured to store the correction coefficient that is obtained by calculating the correction coefficient of the motor control apparatus.

4. A motor control apparatus control method in a motor control apparatus that is configured to perform a power distribution control on three-phase coils of a brushless motor and that is configured to perform a rotation control of a rotor, the motor control apparatus comprising:
   a plurality of switching elements that are arranged to be capable of switching a current which flows through the coils;
   a plurality of sensors each of which is provided so as to correspond to each of the coils and which are configured to detect a rotation position of the rotor; and
   a control part that is configured to output a drive signal which switches the switching element according to a position detection signal that is an output of the plurality of sensors, the control part comprising
   a gate control voltage output unit, a counter value acquisition unit, and a switching control unit, the motor control apparatus control method comprising:
   a gate control voltage output step in which the gate control voltage output unit outputs a drive signal that switches the switching element according to a corrected Hall edge that forms each of six Hall stages which are represented by a combination of electric potentials of position detection signals that are outputs of the plurality of sensors;
   a counter value acquisition step in which the counter value acquisition unit acquires a counter value which is a time period of the Hall stage and which is represented by a time period between two Hall edges that form each of the Hall stages from the position detection signal; and
   a switching control step in which the switching control unit determines a value obtained by multiplying a previous counter value of each of the Hall stages by a preset correction coefficient as a delay time of each of current Hall edges and allows the gate control voltage output unit to output the drive signal according to each of the Hall edges which are corrected by the delay time.

5. The motor control apparatus according to claim 2, wherein the control part comprises a storage unit that is configured to store the correction coefficient that is obtained by calculating the correction coefficient of the motor control apparatus.

* * * * *